United States Patent [19]
Birge

[11] 3,782,513
[45] Jan. 1, 1974

[54] INSPECTION HOLE COVER
[75] Inventor: William T. Birge, Plymouth, Mich.
[73] Assignee: Kelsey-Hayes Company, Romulus, Mich.
[22] Filed: Nov. 4, 1971
[21] Appl. No.: 195,656

[52] U.S. Cl............ 188/206 R, 188/1 A;, 188/2 R, 188/340
[51] Int. Cl............................................. F16d 66/02
[58] Field of Search................... 188/1 A, 1 R, 2 R, 188/206 R, 218 R, 340

[56] References Cited
UNITED STATES PATENTS
2,077,695  4/1937  Horn .............................. 188/2 R X
2,124,949  7/1938  Hollerith ........................ 188/2 R X Primary Examiner—Duane A. Reger
Attorney—J. King Harness et al.

[57] ABSTRACT

A drum brake assembly in which one of the brake members, such as the backing plate is formed with an inspection hole adjacent the lining of the brake shoe for visual inspection of the degree of lining wear without necessitating removal of the drum. A cover is provided for the inspection hole which cover is pivotally supported by the holddown pin of the brake shoe assembly to simplify and reduce the cost of the assembly.

2 Claims, 4 Drawing Figures

PATENTED JAN 1 1974
3,782,513
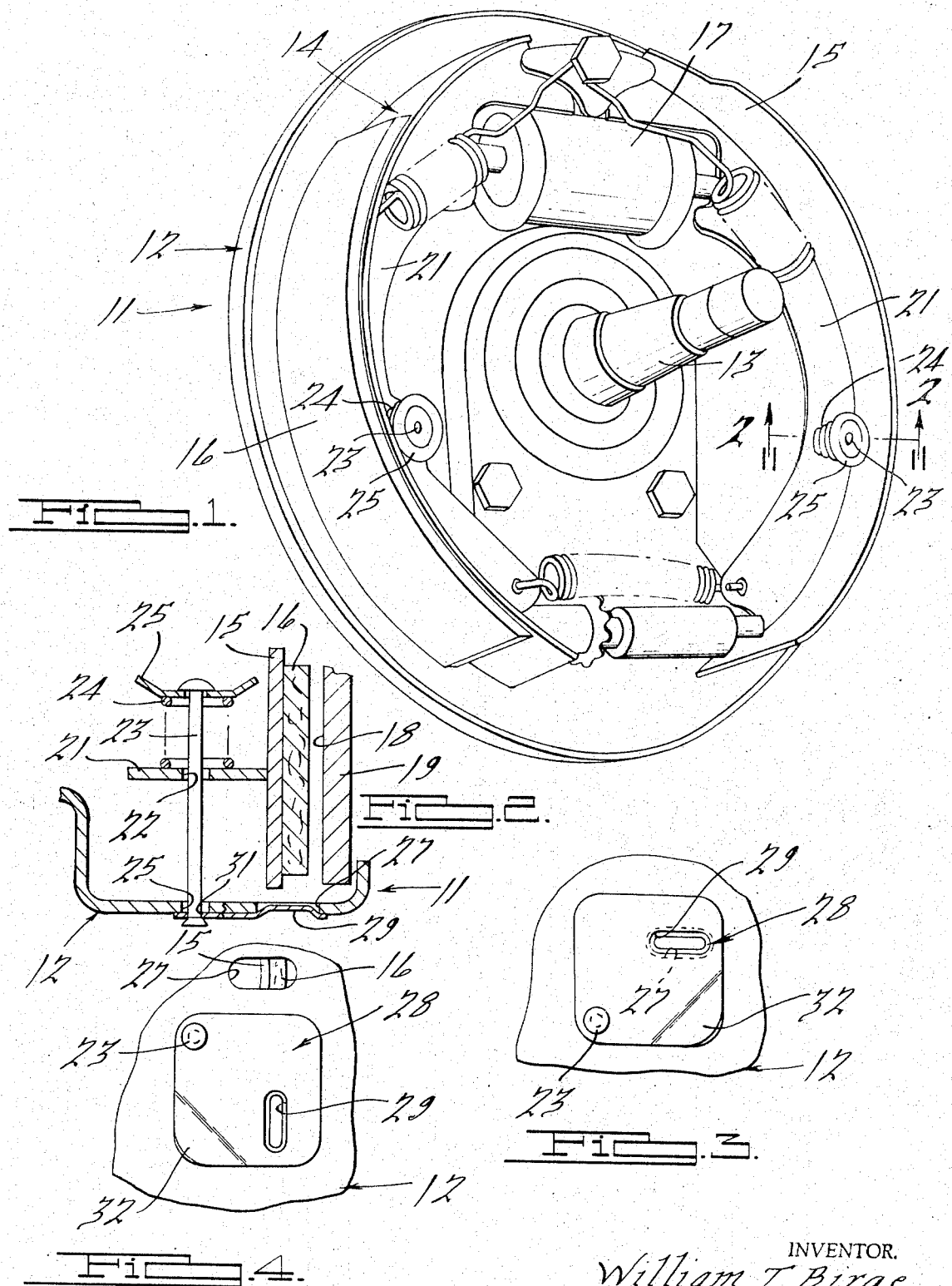
INVENTOR.
William T. Birge
BY
Harness, Dickey & Pierce
ATTORNEYS.

INSPECTION HOLE COVER

BACKGROUND OF THE INVENTION

This invention relates to a drum brake assembly and more particularly to a drum brake assembly in which an arrangement is provided for permitting ready inspection of the condition of wear of the brake shoe linings.

With the construction of a drum brake, it has, heretofore been necessary to remove the brake drum in order to inspect the degree of lining wear of the brake shoes. Normally this has been done at the time the wheel bearings are repacked. With longer lubrication intervals it is quite common for the brake linings to become fully worn before the drum is next removed for normal servicing. Aside from the obvious safety hazards, the continued operation of a vehicle when the brake linings have been worn extensively causes damage to the drum brake surface. This necessitates returning of the drum or replacement.

It is, therefore, a principal object of this invention to provide a means by which the degree of wear of the brake shoe linings may be conveniently observed without necessitating removal of the brake drum.

It is another object of the invention to provide a drum brake assembly having an inspection hole through which the degree of wear of the brake shoe linings may be observed.

Although it is possible to provide an inspection hole for determining the wear of the brake linings in either the brake drum or in the backing plate, it is desirable to provide a cover for the inspection hole to prevent the ingress of dirt or water to the braking surfaces. Such a cover should be easy to open and preferably should be affixed against complete removal to the component in which the inspection hole is formed. All of these requirements should be met with a minimum cost and with minimum changes in present tooling.

It is, therefore, a further object of this invention to provide a brake shoe lining wear inspection hole cover that prevents the ingress of dirt to the braking surfaces and which is simple in construction.

SUMMARY OF THE INVENTION

This invention is adapted to be embodied in a drum brake assembly that includes a drum member, a backing plate member, at least one brake shoe confined within a spaced defined by the drum and backing plate members, the brake shoe having a frictional lining adapted to engage the drum member, and actuating means for moving the frictional lining of the brake shoe into engagement with the drum member. An access or inspection hole is formed in one of the members and is juxtaposed to the frictional lining. The access hole provides a means through which the thickness of the frictional lining may be readily viewed for determining the degree of lining wear.

BRIEF DESCRIPTION OF THE DRAWINGS

FIG. 1 is a perspective view of a drum brake assembly embodying this invention, with the drum removed to more clearly show the construction.

FIG. 2 is an enlarged cross sectional view taken along the line 2—2 in FIG. 1.

FIG. 3 is a plan view showing the inspection hole cover and taken from the rear and backing plate side of the brake assembly.

FIG. 4 is a view, in part similar to FIG. 3, showing the inspection hole cover pivoted to provide access to the inspection hole.

DETAILED DESCRIPTION OF THE PREFERRED EMBODIMENT

An automotive drum brake assembly embodying this invention is identified generally by the reference numeral 11. As is conventional, the brake assembly includes a backing plate 12 that is fixed in a known manner against rotation relative to the wheel spindle 13. A pair of brake shoes 14 and 15 are supported adjacent the backing plate 12 and having frictional linings 16. An actuating cylinder 17 is provided for urging the brake shoe frictional linings 16 into engagement with a braking surface 18 of a drum 19 (FIG. 2).

The brake shoes 14 and 15 have webs 21 that are apertured, as at 22 (FIG. 3) to receive the pin 23 of a holddown spring assembly. A holddown spring 24 encircles the pin 23 and engages the web 21 and a retaining member 25 that is fixed relative to the pin 23 for urging the peripheral edge of the brake shoes 14 and 15 into sliding engagement with fixed lugs (not shown) formed on the backing plate 12. The pin 23 also extends through an aperture 25 and the backing plate 12 for holding the pin in position.

The portion of the brake construction thus far described is conventional. For this reason the actuating mechanism, return springs, adjustment mechanism and all the other components have not been decribed in detail. Only the portions of the brake assembly necessary to understand the invention have been mentioned.

With conventional brake constructions, as has heretofore been noted, it was impossible to determine the degree of wear of the brake shoe linings 16 without removing the drum 19. In accordance with this invention, however, an access or inspection hole 27 is formed in the backing plate 12 contiguous to one or both of the brake shoes 14 and/or 15. The access or inspection hole 27 is juxtaposed to the frictional lining 16 of the respective brake shoe so that the degree of wear of the lining 16 may be readily viewed through the inspection hole 27 as is clearly revealed in FIG. 4.

In order to prevent the ingress of dirt and other contamnants to the brake area and particularly to the braking surface 18, an inspection hole cover, indicated generally by the reference numeral 28 is provided. The inspection hole cover 28 is conveniently formed from a piece of sheet material and is formed with an inwardly struck portion 29 that is complementary in shape to the inspection hole 27. Also, a hole 31 is formed in the cover 28 and receives the pin 23 for pivotally supporting the cover 28 upon the backing plate 12. An offset tab 32 is formed at one corner of the cover 28 to permit convenient pivotal movement of the cover 32 from a position in which it covers and protects the inspection hole 27 (FIG. 3) to a position that permits viewing of the thickness of the lining 16 (FIG. 4).

The pivotal support of the inspection hole cover 28 upon the holddown spring pin 23 has several advantages not the least of which is the low cost at which the convenient inspection is achieved. The disclosed construction requires practically no change to existing tooling and only one, relatively inexpensive, additional part. In addition to these cost advantages, the holddown spring and its pin 23 is normally positioned at a convenient point relative to the brake linings for wear inspection. The resilient biasing aids in insuring that the indented portion 29 will be pressed into the inspection hole opening 27. The cover cannot become lost since it is fixed relative to the backing plate.

It is to be understood that the foregoing description is that of a preferred embodiment of the invention. Various changes and modifications may be made without departing from the spirit and scope of the invention as defined by the appended claims.

I claim:

1. A drum brake assembly including a drum member, a backing plate member, at least one brake shoe contained within the space confined by said members and having a frictional lining adapted to engage said drum member, actuating meaas for moving said frictional lining into engagement with said drum member, holddown spring means including a holddown pin for positioning said brake shoe relative to said backing plate member, said holddown pin extending through an aperture in said backing plate member, an access hole formed in said backing plate member juxtaposed to said frictional lining and through which the thickness of said frictional lining may be readily viewed, and a cover plate pivotally supported on said holddown pin and movable from a position in which said cover plate covers said access hole to a position in which said access hole is exposed for viewing of the thickness of said frictional lining.

2. A drum brake assembly as set forth in claim 1 wherein the cover plate has an indented portion adapted to extend into the access hole and an offset tab for facilitating pivotal movement of said cover plate.

* * * * *